(12) United States Patent
Reeves et al.

(10) Patent No.: US 12,371,113 B1
(45) Date of Patent: Jul. 29, 2025

(54) INTERCHANGEABLE TRACK SYSTEM VEHICLES

(71) Applicants: Robert Reeves, Stonewall, LA (US); Glyn Jordan, Collinston, LA (US)

(72) Inventors: Robert Reeves, Stonewall, LA (US); Glyn Jordan, Collinston, LA (US)

(73) Assignee: G + R Manufactured Solutions, L.L.C., Shreveport, LA (US)

( * ) Notice: Subject to any disclaimer, the term of this patent is extended or adjusted under 35 U.S.C. 154(b) by 730 days.

(21) Appl. No.: 17/676,381

(22) Filed: Feb. 21, 2022

Related U.S. Application Data (60) Provisional application No. 63/152,437, filed on Feb. 23, 2021.

(51) Int. Cl.
  *B62D 55/04* (2006.01)
  *B62D 55/065* (2006.01)
  *B62D 55/10* (2006.01)
  *B62D 55/15* (2006.01)

(52) U.S. Cl.
  CPC ......... *B62D 55/04* (2013.01); *B62D 55/0655* (2013.01); *B62D 55/10* (2013.01); *B62D 55/15* (2013.01)

(58) Field of Classification Search
  CPC .... B62D 55/04; B62D 55/0655; B62D 55/10; B62D 55/15
  USPC ...................................................... 180/9.26
  See application file for complete search history.

(56) References Cited

U.S. PATENT DOCUMENTS

| | | | |
|---|---|---|---|
| 2,618,349 A | 11/1952 | Ludema | |
| 3,957,167 A | 5/1976 | Jacobson et al. | |
| 4,953,919 A | 9/1990 | Langford | |
| 5,607,210 A | 3/1997 | Brazier | |
| 6,006,847 A * | 12/1999 | Knight | B62D 55/04 180/9.26 |
| 6,176,334 B1 | 1/2001 | Lorenzen | |
| 8,245,800 B2 | 8/2012 | Hansen | |
| 8,636,326 B2 * | 1/2014 | Inaoka | B62D 55/084 305/132 |
| 8,851,209 B2 * | 10/2014 | Fukumoto | B62D 55/10 180/9.26 |
| 9,079,614 B2 | 7/2015 | Hansen | |
| 9,149,811 B1 * | 10/2015 | Gilbert | B62D 55/04 |
| 9,505,454 B1 * | 11/2016 | Kautsch | B62D 55/112 |
| 10,150,523 B2 | 12/2018 | Erickson | |
| 2004/0041415 A1 | 3/2004 | Hamm | |
| 2005/0173984 A1 * | 8/2005 | Christianson | B62D 55/30 305/195 |
| 2015/0048671 A1 | 2/2015 | Hansen | |
| 2015/0329154 A1 | 11/2015 | Roy | |
| 2016/0221617 A1 * | 8/2016 | Erickson | B62D 49/00 |
| 2017/0057571 A1 | 3/2017 | Einola et al. | |
| 2017/0113742 A1 * | 4/2017 | Tratta | B62D 55/08 |

* cited by examiner

Primary Examiner — Jacob D Knutson
Assistant Examiner — Morgan Rappe
(74) Attorney, Agent, or Firm — R. Keith Harrison (57) ABSTRACT

Interchangeable track system vehicles may include a vehicle chassis having a pair of rear and front drive axles. An interchangeable track system may be configured for interchangeable deployment with vehicle wheels on at least one of the rear and front drive axles, respectively.

20 Claims, 10 Drawing Sheets

INTERCHANGEABLE TRACK SYSTEM VEHICLES

CROSS-REFERENCE TO RELATED APPLICATIONS

This application claims the benefit of U.S. provisional application No. 63/152,437, filed Feb. 23, 2021, and entitled INTERCHANGEABLE TRACK SYSTEM VEHICLES, which provisional application is hereby incorporated by reference herein in its entirety.

FIELD

Illustrative embodiments of the disclosure relate to forestry harvester vehicles used for felling, delimbing and buckling trees. More particularly, illustrative embodiments of the disclosure relate to forestry harvester vehicles with axle-mounted interchangeable track systems which facilitate interchangeable attachment of tracks and wheels on the vehicle to provide higher ground clearance, lower stabilizing center of gravity, facilitate less destructive and yet more aggressive traction properties and lower ground pressure for wet, soft or irregular terrain.

BACKGROUND

The background description provided herein is solely for the purpose of generally presenting the context of the illustrative embodiments of the disclosure. Aspects of the background description are neither expressly nor impliedly admitted as prior art against the claimed subject matter.

In the forestry industry, jobsite production is frequently inhibited by negative impact to property, accessibility during and after weather events, and equipment limitations in severely saturated soil and/or extreme elevation changes. Soft, wet soil conditions are often unable to adequately support the weight and traffic of conventionally configured machinery without excessive work area degradation and machine wear. Consequently, damage to the environment and stress to equipment occurs, frequently causing jobsites to shut down. Under adverse conditions, work must be limited, relocated, postponed or cancelled. Certain lowland areas may be rendered permanently inaccessible.

SUMMARY

Illustrative embodiments of the disclosure are generally directed to an interchangeable track system vehicle. An illustrative embodiment of the interchangeable track system vehicle may include a vehicle chassis. A pair of rear drive axles and a pair of front drive axles may be independently mounted on the vehicle chassis. A pair of rear drive motors may drivingly engage the rear drive axles, respectively, for rotation. A pair of front drive motors may drivingly engage the front drive axles, respectively, for rotation. A vehicle control system may controllably interface with the rear drive motors and the front drive motors.

An interchangeable track system may be configured for interchangeable deployment with vehicle wheels on the rear drive axles and the front drive axles, respectively. The interchangeable track system may include a pair of rear roller frame mount arms and a pair of front roller frame mount arms configured for mounting on the rear drive axles and the front drive axles, respectively. A pair of rear track assemblies and a pair of front track assemblies may be configured for removable mounting on the rear roller frame mount arms and the front roller frame mount arms, respectively. Each of the rear track assemblies and the front track assemblies may include an elongated roller frame configured for pivotal attachment to each corresponding one of the rear roller frame mount arms and the front roller frame mount arms. A front idler roller and a rear idler roller may be carried by the roller frame. A track may be trained on the front idler roller and the rear idler roller. A sprocket which drivingly engages the track may be configured for driving engagement by a corresponding one of the rear drive axles and the front drive axles.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
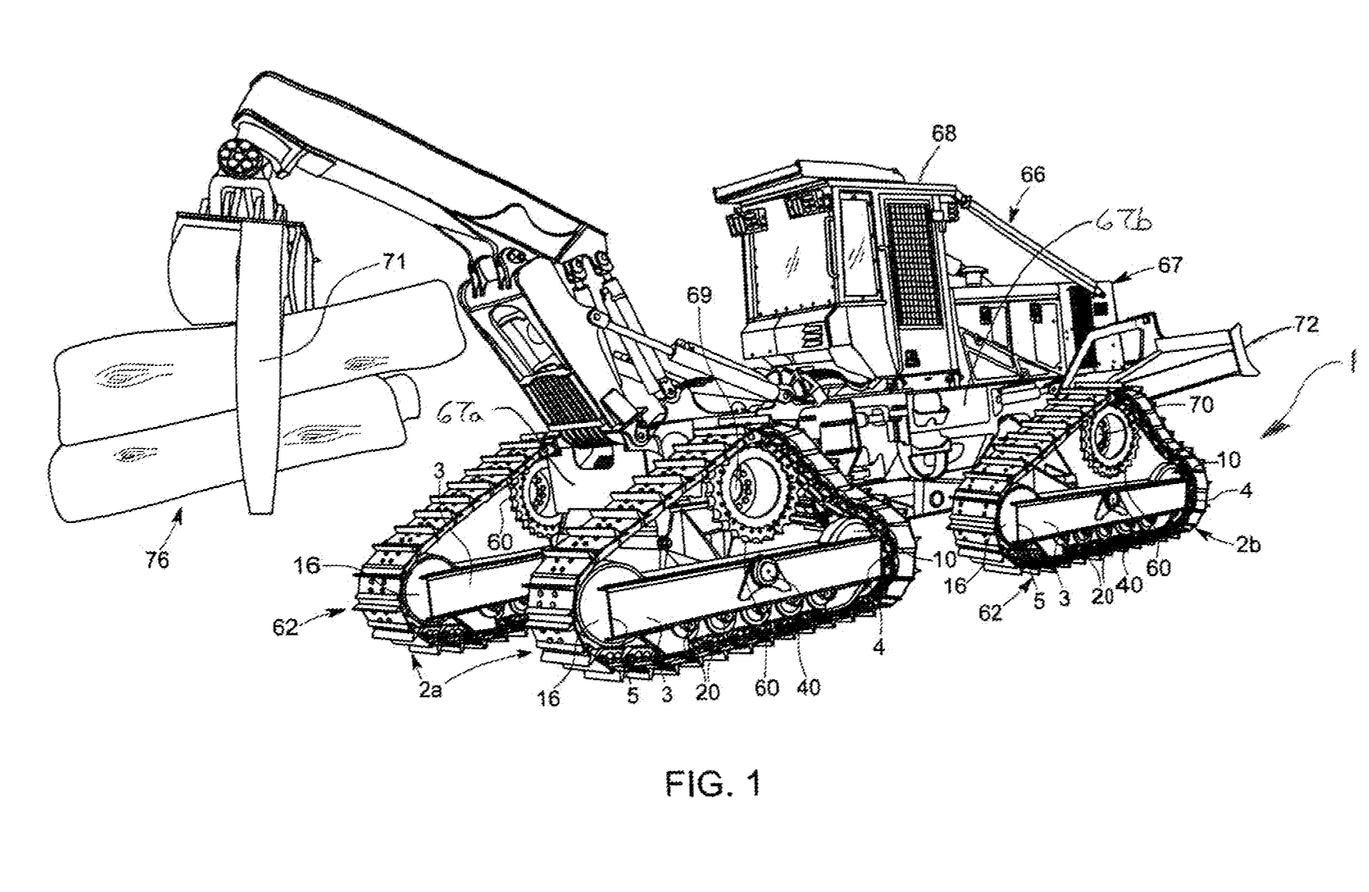
FIG. 1 is a right, rearward side perspective view of an illustrative embodiment of an interchangeable track system vehicle in typical application of the vehicle.
Figure 2:
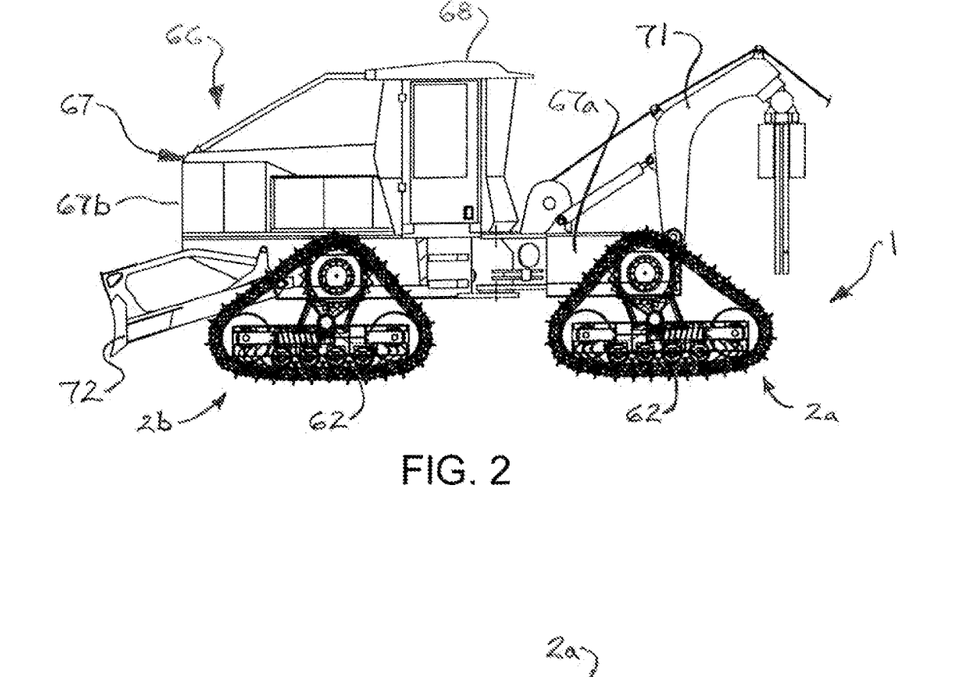
FIG. 2 is a left side view of the illustrative interchangeable track system vehicle.
Figure 3:
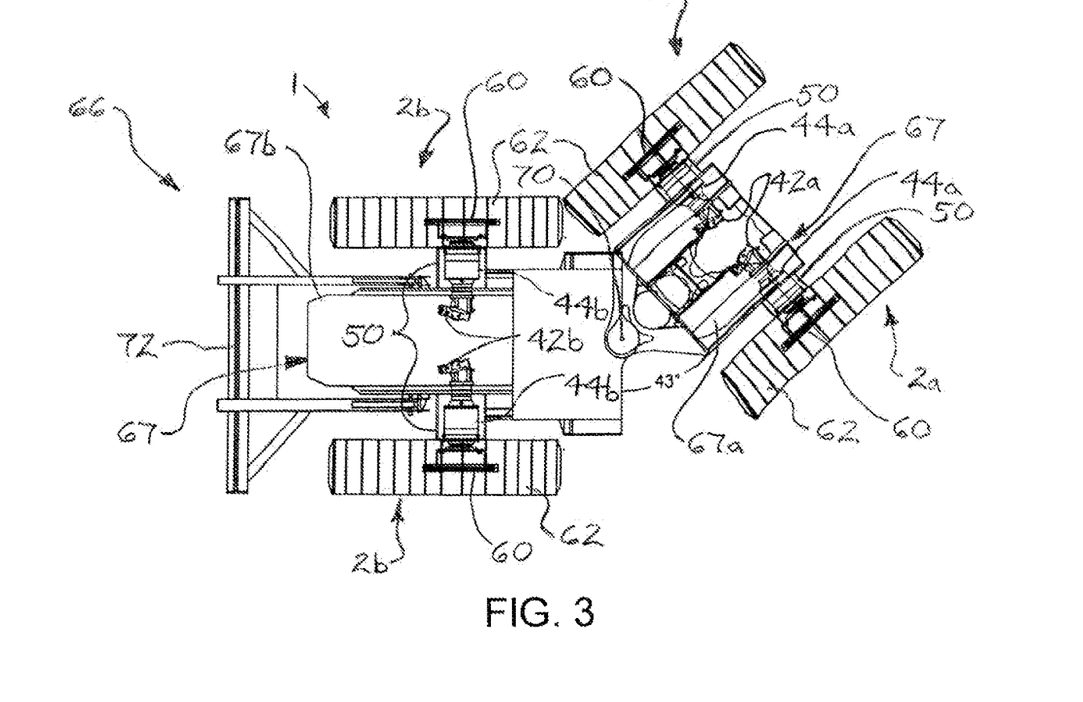
FIG. 3 is a top view of the illustrative interchangeable track system vehicle.
Figure 4:
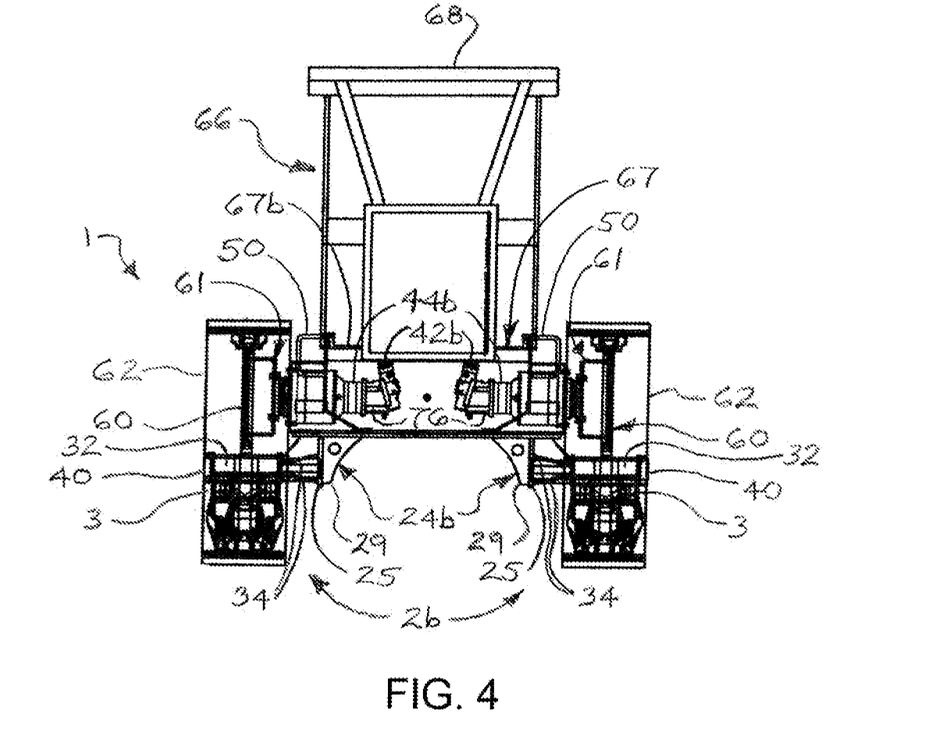
FIG. 4 is a front view of the illustrative interchangeable track system vehicle.

Referring to the drawings, an illustrative embodiment of the interchangeable track system vehicles, hereinafter vehicle 66, is illustrated. As illustrated in FIGS. 1-3 and will be hereinafter further described, the vehicle 66 may be configured as a forestry harvester vehicle which may be used for felling, delimbing and buckling trees. The vehicle 66 may have a standard or conventional design with a vehicle chassis 67. The vehicle chassis 67 may have a rear chassis portion 67a and a front chassis portion 67b. As illustrated in FIG. 3, the rear chassis portion 67a may be pivotally connected to the front chassis portion 67b via a chassis pivot 70. As illustrated in FIGS. 1 and 2, a boom-operated grapple 71 may be provided on the rear chassis portion 67a of the vehicle chassis 67 for grasping, lifting, gathering and carrying cut tree segments 76 (FIG. 1). A vehicle cab 68 may be provided on the front chassis portion 67b. In some applications, a push blade 72 may be provided on the front chassis portion 67b for pushing and moving earth, logs, tree segments and other materials. Other forestry harvester vehicles may be provided with front-mounted, powered saws or shear heads for performing the tree cutting and felling operations.

Figures 8, 9, 10:
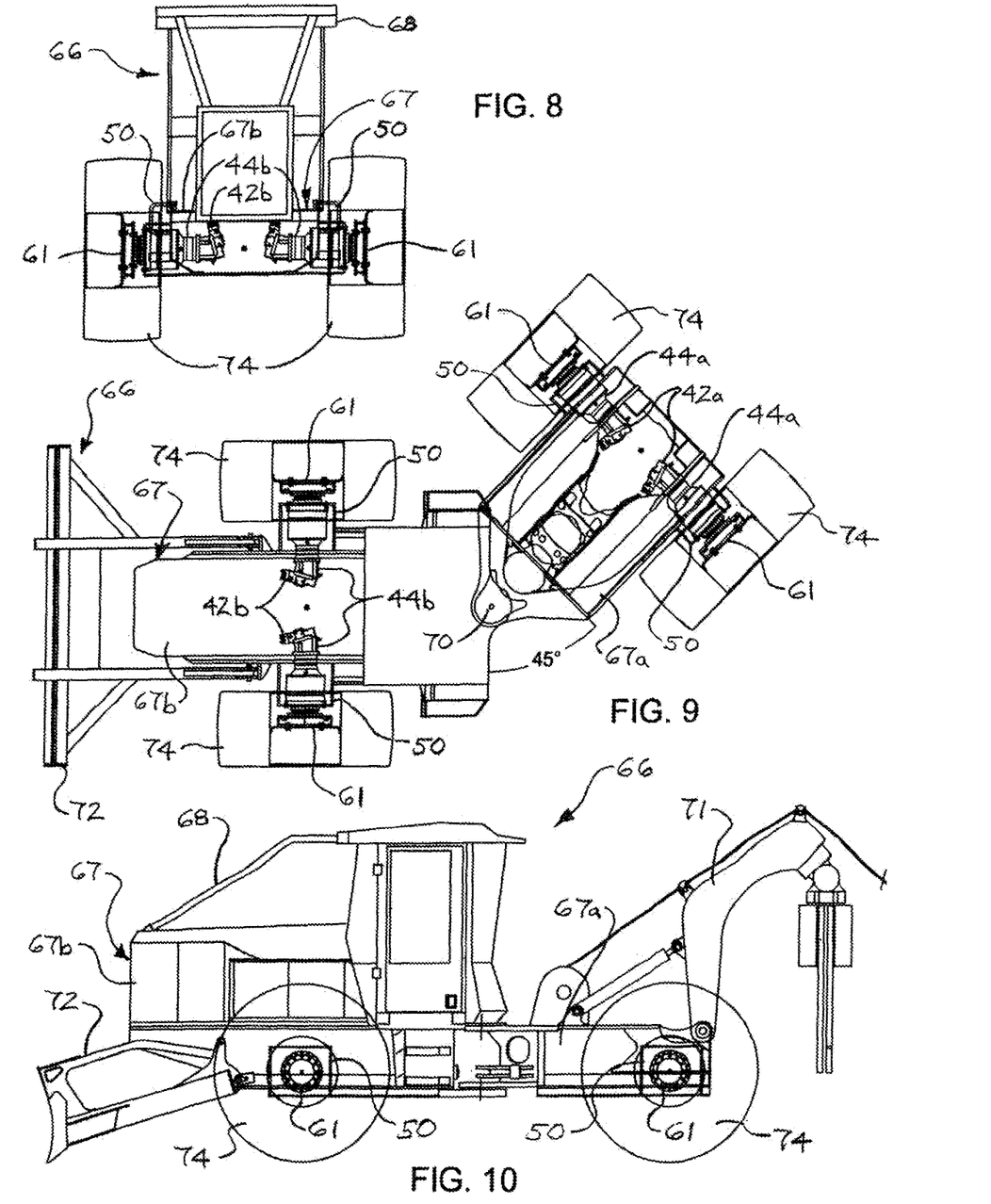
FIG. 8 is a front view of the illustrative interchangeable track system vehicle with the track assemblies removed and the vehicle wheels in place on the vehicle.
FIG. 9 is a top view of the vehicle fitted with the vehicle wheels.
FIG. 10 is a left side view of the vehicle fitted with the vehicle wheels.

As illustrated in FIGS. 3 and 9, a pair of independent, typically electric rear drive motors 42a may be provided on the rear chassis portion 67a of the vehicle chassis 67. A pair of independent rear drive axles 44a may be drivingly engaged for rotation by the respective rear drive motors 42a. A pair of independent, typically electric front drive motors 42b may be provided on the front chassis portion 67b of the vehicle chassis 67, A pair of independent front drive axles 44b may be drivingly engaged for rotation by the respective front drive motors 42b. An interchangeable track system 1 may be interchangeably mountable with vehicle wheels 74 (FIGS. 8-11) on the respective rear drive axles 44a and the respective front drive axles 44b of the vehicle chassis 67, typically as will be hereinafter described.

Each rear drive axle 44a and each front drive axle 44b may be mounted on the corresponding rear chassis portion 67a or front chassis portion 67b using any suitable technique which is known by those skilled in the art. Accordingly, as illustrated in FIGS. 3, 4 and 8-11, in some embodiments, an axle mount frame 50 which is suitable for the purpose may mount each rear drive axle 44a to the rear chassis portion 67a and each front drive axle 44b to the front chassis portion 67b.

Figure 17:
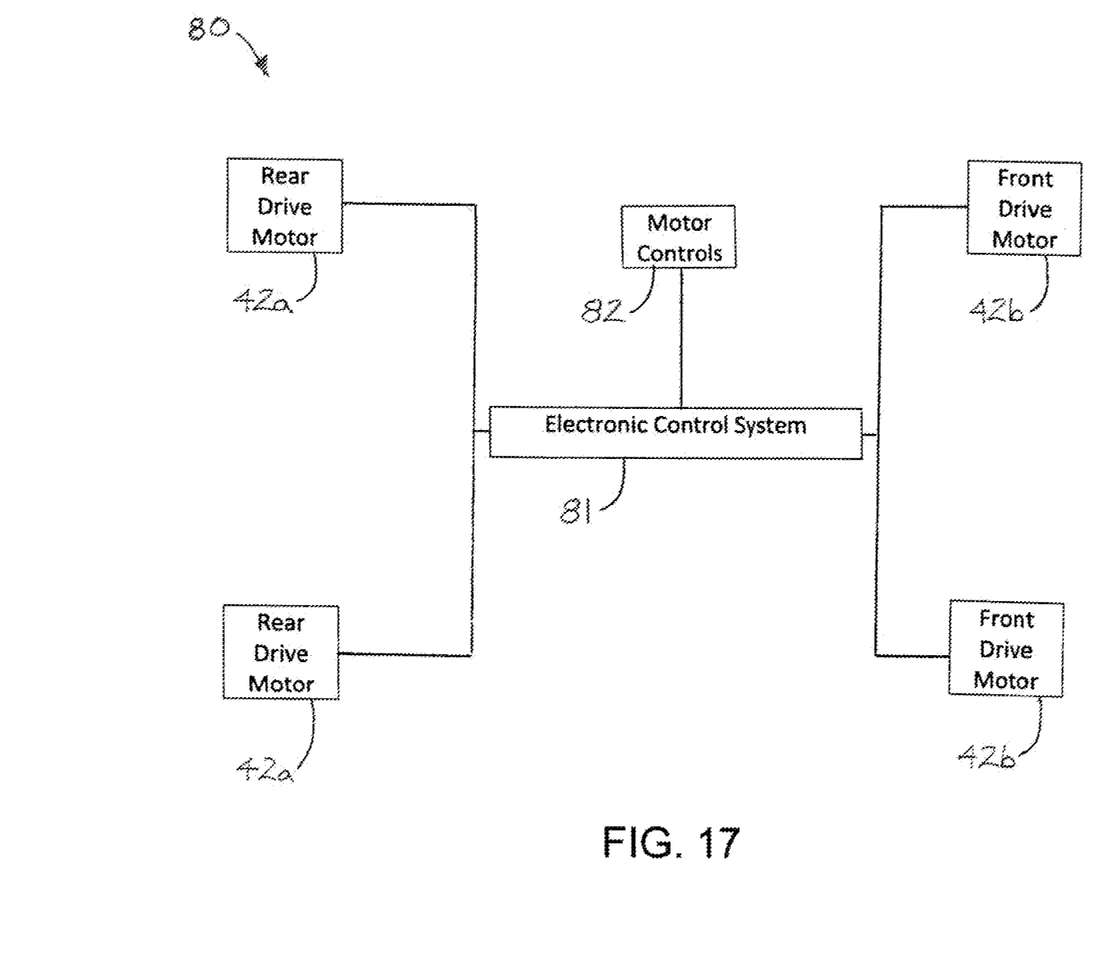
FIG. 17 is a functional block diagram illustrating a typical vehicle control system suitable for the interchangeable track system vehicle.

A typical vehicle control system 80 which is suitable for control of the vehicle 66 is illustrated in FIG. 17. The vehicle control system 80 may include an electronic control system 81. The electronic control system 81 may be mounted on or supported by the vehicle chassis 67 (FIG. 1) of the vehicle 66. The electronic control system 81 may be disposed in electrical communication with the respective rear drive motors 42a and front drive motors 42b of the vehicle 66.

Motor controls 82 may controllably interface with the electronic control system 81. The motor controls 82 may be provided in the vehicle cab 68 (FIG. 1) of the vehicle 66. Accordingly, by actuation of the motor controls 82, the electronic control system 81 may distribute electrical current independently to one or more of the rear drive motors 42a and/or the front drive motors 42b for rotation of the corresponding rear drive axles 44a and/or front drive axles 44b. Typically responsive to input from the motor controls 82, the electronic control system 81 may be configured to facilitate selective, controlled and independent actuation of each rear drive motor 42a and each front drive motor 42b and rotation of the corresponding rear drive axle 44a and front drive axle 44b in the selected forward or reverse direction for enhanced maneuverability of the vehicle 66. The vehicle control system 80 may include the necessary batteries, wiring and other hardware (not illustrated) which may be deemed necessary to facilitate independent control or simultaneous control of two or more of the rear drive motors 42a and/or the front drive motors 42b by manipulation of the motor controls 82 in operation of the vehicle 66. In alternative embodiments, the vehicle control system 80 may include a hydraulic pump and supply system (not illustrated) which may be hydraulically connected to the respective hydraulic rear drive motors 42a and front drive motors 42b for selective independent hydraulic control of the motors.

Figure 11:
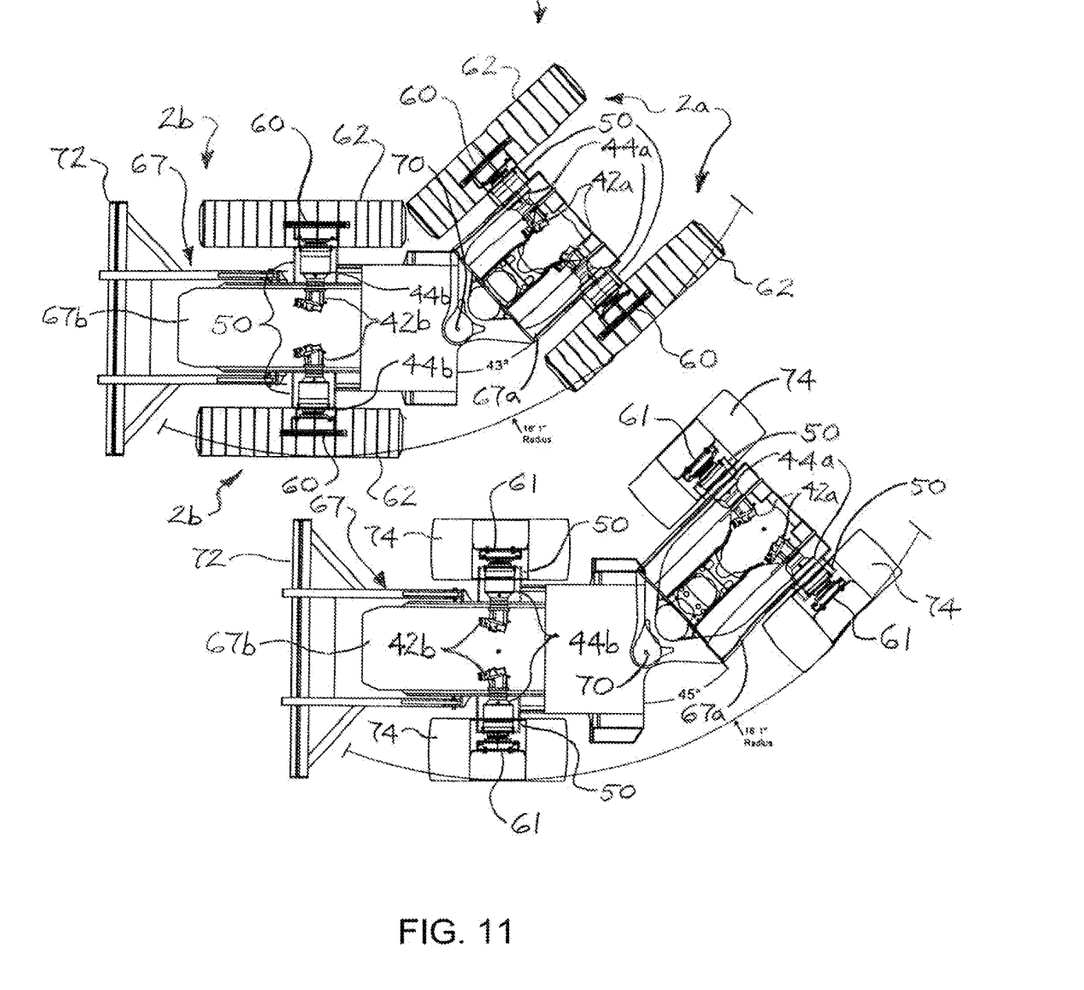
FIG. 11 are top views of the illustrative interchangeable track system vehicle fitted with the track assemblies and with the vehicle wheels, respectively.
Figure 16:
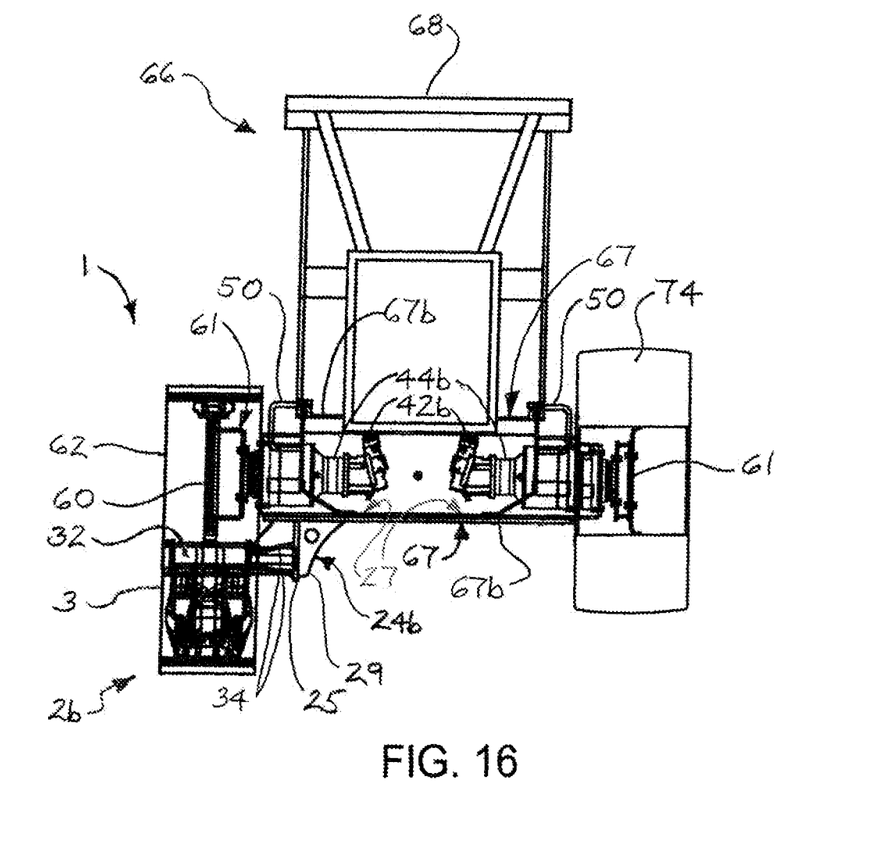
FIG. 16 is a front view of the interchangeable track system vehicle with a front track assembly mounted on the left and a front vehicle wheel mounted on the right of the vehicle chassis for comparison purposes.

As further illustrated in FIGS. 1-4 and 16, the interchangeable track system 1 may include a pair of rear track assemblies 2a and a pair of front track assemblies 2b mountable on the respective rear drive axles 44a and front drive axles 44b of the vehicle 66. The rear track assemblies 2a and the front track assemblies 2b may be mountable in interchangeable relationship with respect to the vehicle wheels 74 (FIGS. 8-11) on the respective rear drive axles 44a and front drive axles 44b. Also illustrated in FIG. 16 is the additional ground clearance gained by deployment of the interchangeable track system 1, comparing a front track assembly 2b mounted on the left front drive axle 44b and a standard or conventional vehicle wheel 74 mounted on the right front drive axle 44b. Lower center of gravity may also be realized using this comparison. Accordingly, the rear track assemblies 2a and the front track assemblies 2b of the interchangeable track system 1 may enable the vehicle 66 to traverse soft soil and other terrain which may not be feasible by traversing the terrain with the vehicle wheels 74. Additionally, the rear track assemblies 2a and the front track assemblies 2b may enable the interchangeable track system vehicle 66 to traverse steep terrain in the felling of timber and retrieval and transport of cut tree segments 76 (FIG. 1). The rear track assemblies 2a and the front track assemblies 2b of the interchangeable track system 1 may thus be mounted in interchangeable relationship with respect to the vehicle wheels 74 on the vehicle chassis 67 of the vehicle 66 depending on which is optimal to enable the vehicle 66 to traverse the terrain for a particular application. As illustrated in FIG. 11, the interchangeable track system 1 may enable independent steering of the rear track assemblies 2a relative to the front track assemblies 2b throughout operation of the vehicle 66.

Figure 6:
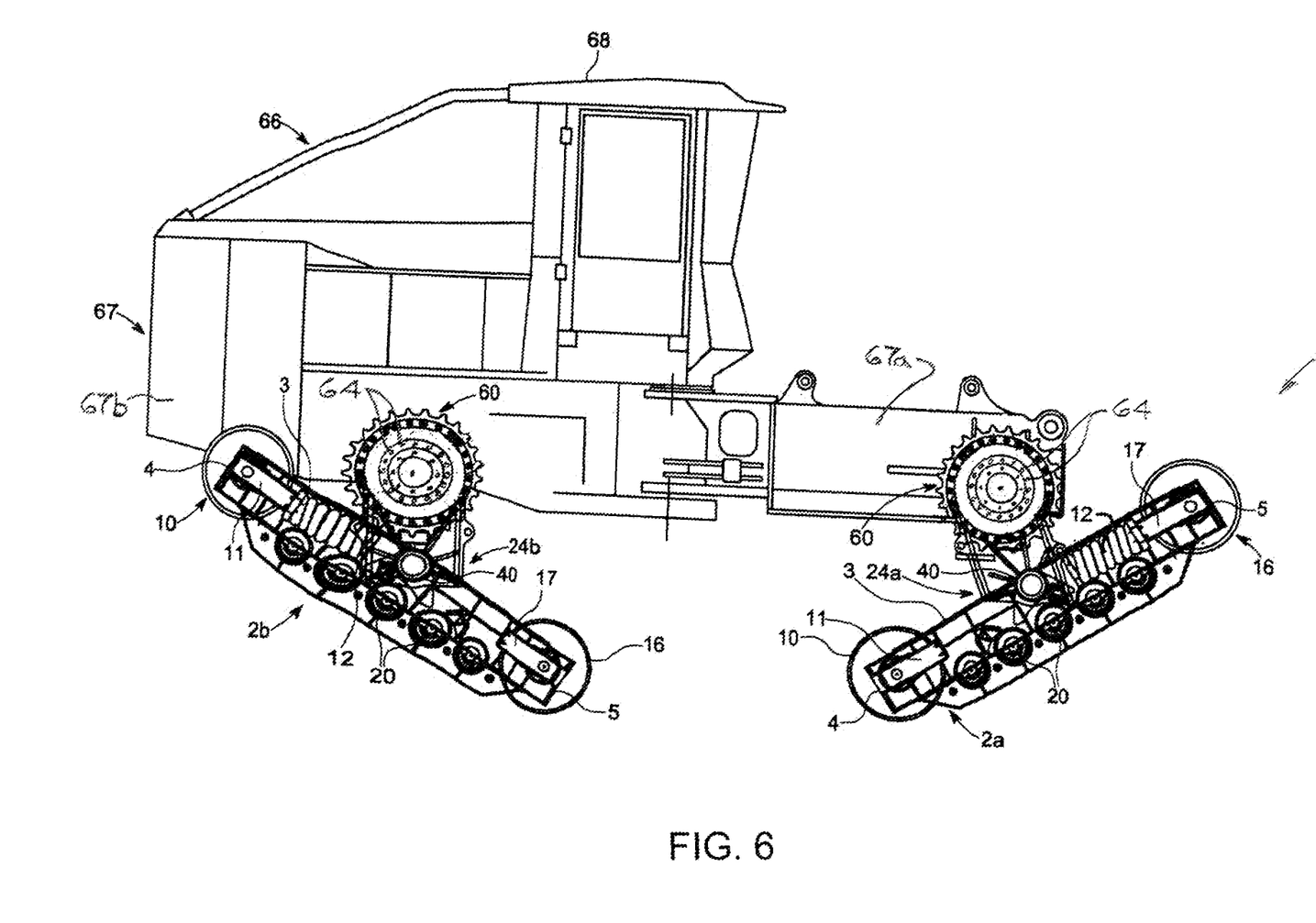
FIG. 6 is a right side view of the illustrative interchangeable track system vehicle, with the track removed from each track assembly on the vehicle and each track assembly disposed in a pivoted configuration relative to the chassis of the vehicle.
Figure 7:
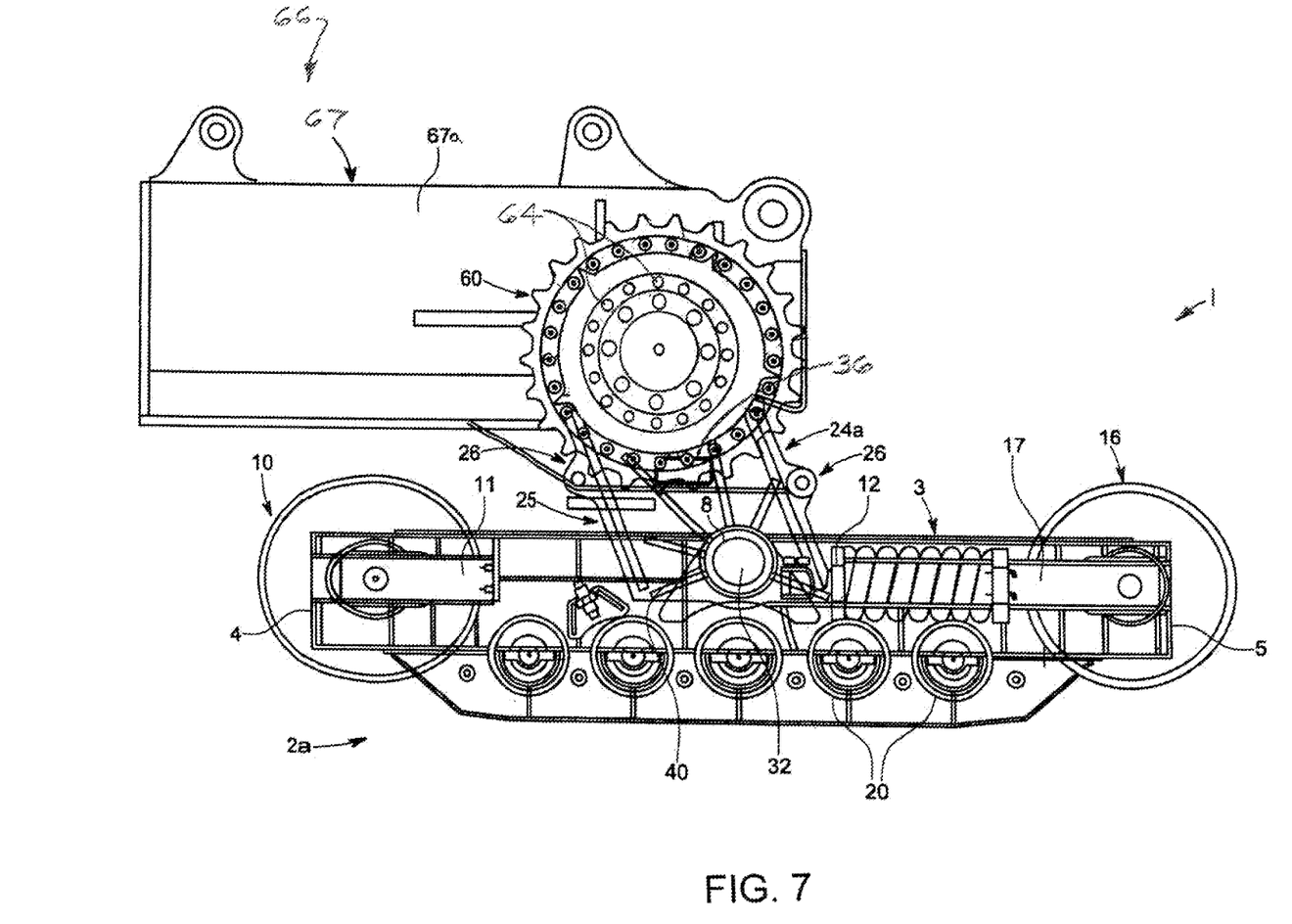
FIG. 7 is an enlarged right side view of a rear track assembly with the track removed from the track assembly.

Each rear track assembly 2a and each front track assembly 2b of the interchangeable track system 1 may have a design which is the same as or similar to that disclosed in U.S. application Ser. No. 17/106,497, U.S. Pat. No. 11,753,092, which application is hereby incorporated by reference herein in its entirety. Accordingly, as illustrated in FIGS. 6 and 7, each rear track assembly 2a and each front track assembly 2b may include an elongated roller frame 3. The roller frame 3 may have a front roller frame end 4 and a rear roller frame end 5. As illustrated in FIG. 7, a front roller arm 11 and a rear roller arm 17 may be mounted on the roller frame 3 according to the knowledge of those skilled in the art. A front idler roller 10 may be journaled for rotation on the front roller arm 11 at the front roller frame end 4 of the roller frame 3. A rear idler roller 16 may be journaled for rotation on the rear roller arm 17 at the rear roller frame end 5 of the roller frame 3. On each rear track assembly 2a, a hydraulic track adjuster/recoil spring assembly unit 12 may engage the rear roller arm 17 to bias the rear idler roller 16 rearwardly. On each front track assembly 2b, a hydraulic track adjuster/recoil spring assembly unit 12 may in like manner engage the front roller arm 11 to bias the front idler roller 10 forwardly. A plurality of spaced-apart bottom rollers 20 may be mounted on the roller frame 3 between the front roller arm 11 and the rear roller arm 17. As further illustrated in FIG. 7, a pivot shaft opening 8 may extend laterally through the roller frame 3 substantially equidistant between the front roller frame end 4 and the rear roller frame end 5 at the center of gravity of the roller frame 3 for purposes which will be hereinafter described.

An endless track 62 may be trained around the front idler roller 10, the rear idler roller 16 and the bottom rollers 20. The track 62 may be fabricated of steel and may have a standard or conventional track design or construction known by those skilled in the art.

Figures 12, 13:
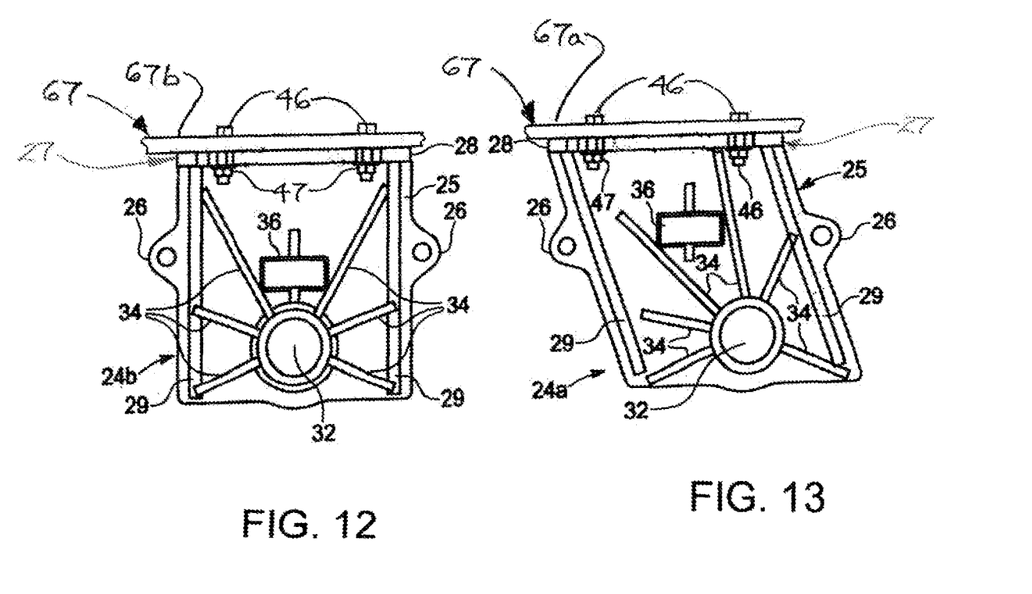
FIG. 12 is a side view of a typical front roller frame mount arm of a front track assembly mounted on the chassis of the interchangeable track system vehicle.
FIG. 13 is a side view of a typical rear roller frame mount arm of a rear track assembly mounted on the chassis of the interchangeable track system vehicle.
Figures 14, 15:
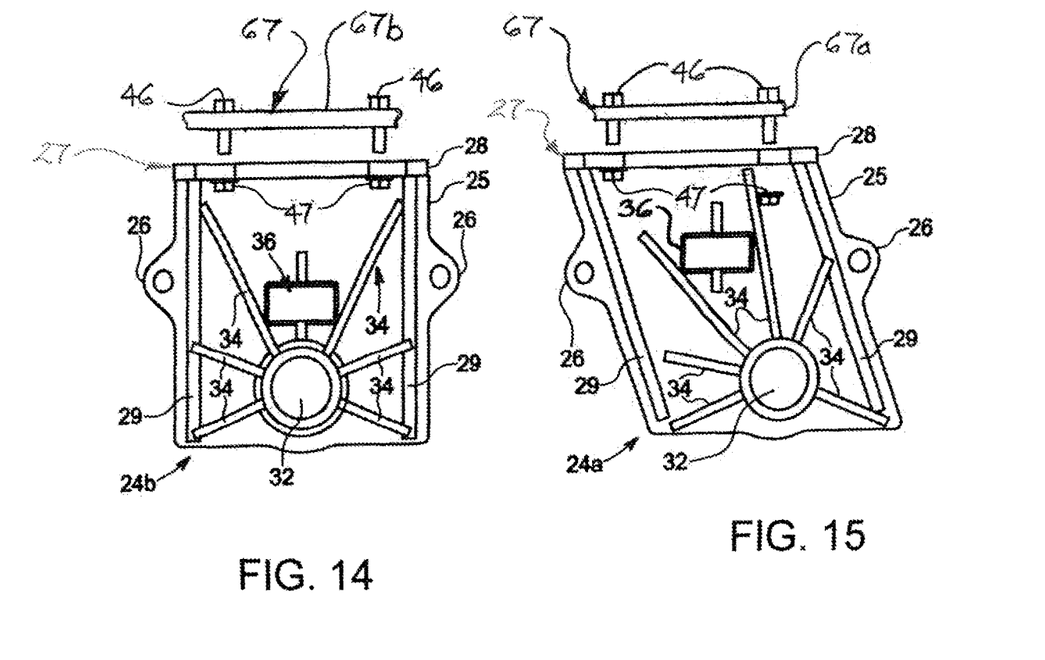
FIG. 14 is an exploded side view illustrating a typical bolt technique for mounting the front roller frame mount arm on the chassis of the vehicle.
FIG. 15 is an exploded side view illustrating a typical bolt technique for mounting the rear roller frame mount arm on the chassis of the vehicle.

A roller frame mount arm 24 may pivotally mount the roller frame 3 of each rear track assembly 2a and each front track assembly 2b to the corresponding rear chassis portion 67a or front chassis portion 67b of the vehicle chassis 67, typically at the pivot shaft opening 8. As illustrated in FIGS. 13 and 15, the roller frame mount arms 24 may include a pair of rear roller frame mount arms 24a which mount the roller frames 3 of the rear track assemblies 2a to the rear chassis portion 67a beneath the respective rear drive axles 44a. As illustrated in FIGS. 12 and 14, in like manner, a pair of front roller frame mount arms 24b may mount the roller frames 3 of the front track assemblies 2b to the front chassis portion 67b beneath the respective front drive axles 44b.

Each rear roller frame mount arm 24a and each front roller frame mount arm 24b may have a design which is the same as or similar to that described in U.S. application Ser. No. 17/106,497. Accordingly, each rear roller frame mount arm 24a and each front roller frame mount arm 24b may include a pivoting shaft frame 25. As further illustrated in FIGS. 12 and 14, the shaft frame 25 of each front roller frame mount arm 24b may be generally elongated and rectangular. As illustrated in FIGS. 13 and 15, the shaft frame 25 of each rear roller frame mount arm 24a may have a parallelogram shape. In some embodiments, a pair of rod eyes 26 may extend from the opposite front and rear sides of each shaft frame 25 for purposes which will be hereinafter described. The shaft frame 25 of each rear roller frame mount arm 24a and each front roller frame mount arm 24b may be mounted on the corresponding rear chassis portion 67a and front chassis portion 67b using frame arm mount bolts 46 and securing nuts 47 and/or by using brackets, plates, blocks and/or other suitable attachment techniques known by those skilled in the art. In other embodiments, the shaft frame 25 may be welded and/or otherwise fixedly or permanently attached to the vehicle chassis 67.

As illustrated in FIGS. 12-15, an arm mount frame 27 may extend inwardly (toward the longitudinal midline of the vehicle 66) from the shaft frame 25. The arm mount frame 27 may include a top frame plate 28 which may be substantially perpendicular to the plane of the shaft frame 25. A pair of parallel, spaced-apart, front and rear side frame plates 29 may extend from the shaft frame 25 beneath the top frame plate 28.

As illustrated in FIGS. 12-16, an elongated roller frame pivot mount shaft 32 may extend outwardly (away from the longitudinal midline of the vehicle 66) from the shaft frame 25. A plurality of shaft mount plates 34 may extend between the shaft frame 25 or the side frame plates 29 and the roller frame pivot mount shaft 32 for shaft reinforcing purposes. The roller frame pivot mount shaft 32 may be suitably sized and configured to removably receive the companion pivot shaft opening 8 (FIG. 7) in the corresponding roller frame 3 to pivotally mount the roller frame 3 on the roller frame pivot mount shaft 32. A shaft cap 40 may be detachably attached to the extending or distal end of the roller frame pivot mount shaft 32 to secure or retain the roller frame 3 on the roller frame pivot mount shaft 32.

As further illustrated in FIGS. 7 and 12-15, in some embodiments, a forklift insertion frame 36 may extend outwardly from the shaft frame 25 typically between the shaft mount plates 34 of each rear roller frame mount arm 24a and each front roller mount frame arm 24b. The forklift insertion frame 36 may be suitably sized and configured to receive a forklift blade (not illustrated) on a forklift to facilitate raising and lowering of each corresponding rear track assembly 2a and front track assembly 2b in installation and removal of the interchangeable track system 1 on and from, respectively, the vehicle 66, as will be hereinafter further described.

Figure 5:
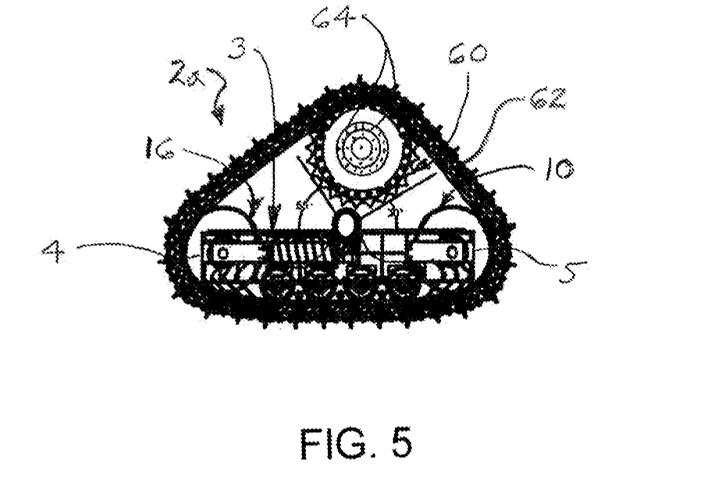
FIG. 5 is a right side view of a typical front track assembly of the interchangeable track system vehicle.

As illustrated in FIGS. 5-7, each rear track assembly 2a and each front track assembly 2b may include a sprocket 60 which may be releasably and drivingly engaged for rotation by the corresponding rear drive axle 44a and front drive axle 44b. The sprocket 60 may be drivingly and releasably or fixedly coupled to the corresponding rear drive axle 44a or front drive axle 44b according to any suitable technique known by those skilled in the art. In some embodiments, the sprocket 60 may be attached to the standard or conventional wheel attachment interface 61 (FIGS. 8-11) on the corresponding rear drive axle 44a or front drive axle 44b using a plurality of sprocket fasteners 64. Accordingly, responsive to driving rotation by the corresponding rear drive axle 44a and front drive axle 44b, each sprocket 60 drivingly engages the track 62 of the corresponding rear track assembly 2a and front track assembly 2b to traverse the front idler roller 10, the rear idler roller 16 and the bottom rollers 20 (FIGS. 6 and 7). The rear idler roller 16 (FIG. 7), biased by the hydraulic track adjuster/recoil spring assembly unit 12 via the rear roller arm 17, may tension the track 62 via the rear roller arm 17. In like manner, the front idler roller 10, biased by its corresponding hydraulic track adjuster/recoil spring assembly unit 12 via the front roller arm 11, may tension the track 62 via the front roller arm 11.

In typical application, the interchangeable track assembly 1 can be deployed on the vehicle 66 in interchangeable relationship to the vehicle wheels 74 (FIGS. 8-11) depending on the type of soil or terrain which the vehicle 66 will traverse during the logging operation. Some types of soil or terrain may be better suited to use of the vehicle wheels 74. Accordingly, as illustrated in FIGS. 8-11, the vehicle wheels 74 may be coupled to the respective rear drive axles 44a and the respective front drive axles 44b typically at the wheel attachment interface 61 using lug bolts and nuts or the like.

In the event that the interchangeable track assembly 1 is deemed more suitable for traversing some types of soil or terrain than the vehicle wheels 74, the vehicle wheels 74 may initially be removed from the wheel attachment interfaces 61 of the respective rear drive axles 44a and front drive axles 44b. The rear roller frame mount arm 24a and the front roller frame mount arm 24b of each corresponding rear track assembly 2a and front track assembly 2b may be attached to the corresponding rear chassis portion 67a and front chassis portion 67b of the vehicle chassis 67 beneath each corresponding rear drive axle 44a and front drive axle 44b. The shaft frame 25 of each rear roller frame mount arm 24a and each front roller frame mount arm 24b may be mounted on the corresponding rear chassis portion 67a and front chassis portion 67b using the frame arm mount bolt 46 and securing nuts 47, as was heretofore described with respect to FIGS. 12-15, and/or by using brackets, plates, frames and/or other suitable mechanical fasteners (not illustrated) known by those skilled in the art.

In some embodiments, the rear track assemblies 2a and the front track assemblies 2b may be fixedly or permanently attached to the respective rear drive axles 44a and front drive axles 44b. Accordingly, the rear roller mount frame arms 24a and the front roller mount frame arms 24b may be welded and/or otherwise fixedly attached to the respective rear chassis portion 67a and front chassis portion 67b of the vehicle chassis 67. The shaft frame 25 may be welded and/or otherwise fixedly attached to the roller frame pivot mount shaft 32 of each corresponding rear roller mount frame arm 24a and front roller mount frame arm 24b.

The sprocket 60 of each rear track assembly 2a and each front track assembly 2b may be attached to the wheel attachment interface 61 on each corresponding rear drive axle 44a and front drive axle 44b typically using the sprocket fasteners 64 as was heretofore described with respect to FIGS. 6 and 7. A forklift (not illustrated) may then be used to raise each of the rear track assembly 2a and the front track assembly 2b and facilitate alignment or registration of the pivot shaft opening 8 (FIG. 7) in each roller frame 3 with the roller frame pivot mount shaft 32 of each corresponding rear roller frame mount arm 24a and front roller frame mount arm 24b. Engagement of the forklift with the rear track assembly 2a or front track assembly 2b may be carried out by extending the forklift blade on the forklift into the forklift insertion frame 36 on the rear roller frame mount arm 24a or front roller frame mount arm 24b. The forklift may then be operated to move the rear track assembly 2a or front track assembly 2b medially (toward the longitudinal midline of the vehicle 66) until the roller frame pivot mount shaft 32 inserts through the pivot shaft opening 8 in the roller frame 3. Simultaneously, the sprocket 60 may mesh with the track 62 for driving engagement. The shaft cap 40 may then be secured on the end of the roller frame pivot mount shaft 32 to retain the roller frame 3 thereon.

The vehicle 66 may be operated over soft, hilly or mountainous terrain to delimb and buckle trees typically using the grapple 71 (FIGS. 1 and 2) and the push blade 72 in the conventional manner. As illustrated in FIG. 3, the front chassis portion 67b may be capable of pivoting vertically relative to the rear chassis portion 67a of the vehicle chassis 67, typically via the chassis pivot point 70. As illustrated in FIG. 6, the roller frame 3 of each rear track assembly 2a and each front track assembly 2b may be capable of pivoting forwardly and rearwardly about the corresponding roller frame mount arm 24 to accommodate variations in the terrain during the forestry operation. Because of the independent mounting of the rear track assemblies 2a and the front track assemblies 2b to the respective rear drive axles 44a and front drive axles 44b, respectively, the vehicle 66 is capable of steering without interference. Moreover, the electronic control system 81 of the vehicle control system 80 (FIG. 17) may be capable of independently applying torque to one or both of the rear drive motors 42a and/or one or both of the front drive motors 42b. This expedient may facilitate fine adjustments in the traction capability of the vehicle 66 to enable the vehicle 66 to traverse different types and slopes of terrain.

In the event that it is deemed necessary to remove the rear track assemblies 2a and the front track assemblies 2b of the interchangeable track system 1 from the vehicle 66 and deploy the vehicle wheels 74 on the respective rear drive axles 44a and front drive axles 44b, the rear track assemblies 2a and the front track assemblies 2b may be removed from the respective rear roller frame mount arms 24a and front roller frame mount arms 24b typically by reversing the steps described above.

In deployment of the vehicle wheels 74 on the vehicle 66, the rear roller frame mount arms 24a and the front roller frame mount arms 24b may be removed from the respective rear chassis portion 67a and front chassis portion 67b along with the rear track assemblies 2a and the front track assemblies 2b. Accordingly, the forklift blade of a forklift may initially be extended into the forklift insertion frame 36 of each rear roller frame mount arm 24a and each front roller frame mount arm 24b. As illustrated in FIGS. 13 and 15, the nuts 47 may be removed from the respective frame arm mount bolts 46 which attach the shaft frame 25 of each rear roller frame mount arm 24a and each front roller frame mount arm 24b to the rear chassis portion 67a and the front chassis portion 67b of the vehicle chassis 67. The forklift may then be operated to lower the rear roller frame mount arm 24a or front roller mount frame arm 24b from the corresponding rear chassis portion 67a or front chassis portion 67b, and the vehicle wheels 74 may be replaced on the respective rear drive axles 44a and front drive axles 44b typically as was heretofore described.

It will be appreciated by those skilled in the art that the interchangeable track system 1 can be used to replace conventional round tires with substantially flattened ground-contouring steel track units that enhance power through overall gear ratio reduction. The resulting extra power cases stress on engine and powertrain components. Moreover, through the pivot shaft support system, vehicle weight is separated from the front and rear drive axle wheel bearings. A beneficial byproduct is the capability to transfer the tracked components into a new or different vehicle in the event that the vehicle is sold or retired.

In some embodiments, two connecting rods (not illustrated), one front and one rear, may connect the front roller frame mount arms 24b of the respective front track assemblies 2b to each other and the rear roller frame mount arms 24a of the respective rear track assemblies 2a to each other. In some embodiments, a pair of connecting rods may connect the rear roller frame mount arms 24a to each other in front of and behind, respectively, the rear drive axles 44a. In like manner, a pair of connecting rods may connect the front roller frame mount arms 24b to each other in front of and behind, respectively, the front drive axles 44b. Rod threads may terminate the respective ends of each connecting rod. Accordingly, each threaded end of each connecting rod may be inserted through a rod eye 26 (FIGS. 12-15) on the shaft frame 25 of each corresponding rear roller frame mount arm 24a and front roller frame mount arm 24b. Nuts (not illustrated) may be threaded on the rod threads to secure each end of each connecting rod in the corresponding rod eye.

It will be further appreciated by those skilled in the art that the interchangeable track system accomplishes all of the following through the design and implementation of its components:
A), greatly reduced ground pressure with added aggressive traction characteristics;
  a). reduced impact on forested land; and
  b). greater ability to operate on steeply sloped jobsites.
B). higher ground clearance
  a). reduced contact with stumps and other obstacles.
C). lower center of gravity
  a). enables stability on extreme slopes, even traversed
D). Adaptability to transfer between other machines.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. An interchangeable track system vehicle, comprising:
a vehicle chassis;
at least one rear drive axle on the vehicle chassis;
at least one front drive axle on the vehicle chassis;
an interchangeable track system for interchangeable motor driven deployment with vehicle wheels on the rear drive axle and front drive axle, respectively, the interchangeable track system including:
  a pair of rear roller frame mount arms and a pair of front roller frame mount arms configured for independent mounting on the vehicle chassis beneath the rear drive axle and of front drive axle, respectively, each of the pair of rear roller frame mount arms and the pair of front roller frame mount arms comprising:
    a shaft frame; and
    an arm mount frame comprising a top frame plate carried by the shaft frame, the top frame plate configured for removable and direct mounting on the vehicle chassis beneath and independently of each corresponding one of the rear drive axle and the front drive axle, the top frame plate substantially perpendicular to a plane of the shaft frame; and
  a pair of rear track assemblies and a pair of front track assemblies configured for removable mounting on the pair of rear roller frame mount arms and the pair of front roller frame mount arms, respectively, each of the pair of rear track assemblies and the pair of front track assemblies including:
    an elongated roller frame configured for pivotal attachment to each corresponding one of the pair of rear roller frame mount arms and the pair of front roller frame mount arms;
    a front idler roller and a rear idler roller carried by the roller frame;
    a track trained on the front idler roller and the rear idler roller; and
    a sprocket configured for driving engagement by a corresponding one of the rear drive axle and the front drive axle, the sprocket drivingly engaging the track.

2. The interchangeable track system vehicle of claim 1 wherein each of the pair of rear roller frame mount arms and the pair of front roller frame mount arms comprises a roller frame pivot mount shaft, and the roller frame is pivotally carried by the roller frame pivot mount shaft.

3. The interchangeable track system vehicle of claim 2 wherein the roller frame pivot mount shaft extends from the shaft frame.

4. The interchangeable track system vehicle of claim 3 wherein the shaft frame of each of the pair of rear roller frame mount arms is generally elongated and rectangular and the shaft frame of each of the pair of front roller frame mount arms has a parallelogram shape.

5. The interchangeable track system vehicle of claim 3 further comprising a plurality of shaft mount plates extending between the shaft frame and the roller frame pivot mount shaft.

6. The interchangeable track system vehicle of claim 3 further comprising a pivot shaft opening extending laterally through the roller frame at a center of gravity of the roller frame, and wherein the roller frame pivot mount shaft is inserted in the pivot shaft opening.

7. The interchangeable track system vehicle of claim 3 further comprising a forklift insertion frame carried by the shaft frame.

8. The interchangeable track system vehicle of claim 3 further comprising a pair of parallel, spaced-apart, front and rear side frame plates extending from the shaft frame beneath the top frame plate.

9. An interchangeable track system vehicle, comprising:
a vehicle chassis comprising a rear chassis portion and a front chassis, portion pivotally attached to the rear chassis portion;
at least one rear drive axle on the rear chassis portion of the vehicle chassis;
at least one front drive axle on the front chassis portion of the vehicle chassis, the rear drive axle and the front drive axle having wheel attachment interfaces, respectively;
and
an interchangeable track system for interchangeable motor driven deployment with vehicle wheels on the wheel attachment interfaces on the rear drive axle and the front drive axle, respectively, the interchangeable track system including:
  a pair of front roller frame mount arms and a pair of rear roller frame mount arms configured for independent mounting on the front chassis portion and the rear chassis portion, respectively, of the vehicle chassis beneath the front drive axle and the rear drive axle, respectively, each of the pair of front roller frame mount arms and the pair of rear roller frame mount arms comprising:
    a shaft frame; and
    arm mount frame comprising a top frame plate carried by the shaft frame, the top frame plate configured for removable and direct mounting on the vehicle chassis beneath and independently of each corresponding one of the rear drive axle and the front drive axle, the top frame plate substantially perpendicular to a plane of the shaft frame; and a pair of front track assemblies and a pair of rear track assemblies configured for removable mounting on the pair of front roller frame mount arms and the pair of rear roller frame mount arms, respectively, each of the pair of front track assemblies and the pair of rear track assemblies including:
  an elongated roller frame configured for pivotal attachment to each corresponding one of the pair of front roller frame mount arms and the pair of rear roller frame mount arms:
  a front idler roller and a rear idler roller carried by the roller frame:
  a track trained on the front idler roller and the rear idler roller; and
  a sprocket configured for attachment to each corresponding one of the wheel attachment interfaces on the front drive axle and the rear drive axle, respectively, in interchangeable relationship with each corresponding one of the vehicle wheels, the sprocket drivingly engaging the track.

10. The interchangeable track system vehicle of claim 9 wherein each of the pair of front roller frame mount arms and the pair of rear roller frame mount arms comprises a roller frame pivot mount shaft, and the roller frame is pivotally carried by the roller frame pivot mount shaft.

11. The interchangeable track system vehicle of claim 10 wherein the roller frame pivot mount shaft extends from the shaft frame.

12. The interchangeable track system vehicle of claim 11 wherein the shaft frame of each of the pair of rear roller frame mount arms has a parallelogram shape and the shaft frame of each of the pair of front roller frame mount arms is generally elongated and rectangular.

13. The interchangeable track system vehicle of claim 11 further comprising a plurality of shaft mount plates extending between the shaft frame and the roller frame pivot mount shaft.

14. The interchangeable track system vehicle of claim 11 further comprising a pivot shaft opening extending laterally through the roller frame at a center of gravity of the roller frame, and wherein the roller frame mount pivot shaft is inserted in the pivot shaft opening.

15. The interchangeable track system vehicle of claim 11 further comprising a forklift insertion frame carried by the shaft frame.

16. The interchangeable track system vehicle of claim 11 further comprising a pair of parallel, spaced-apart, front and rear side frame plates extending from the shaft frame beneath the top frame plate.

17. An interchangeable track system vehicle, comprising:
a vehicle chassis comprising a rear chassis portion and a front chassis portion pivotally attached to the rear chassis portion;
at least one rear drive axle on the rear chassis portion of the vehicle chassis;
at least one front drive axle on the front chassis portion of the vehicle chassis, the rear drive axle and the front drive axle having wheel attachment interfaces, respectively;
an interchangeable track system for interchangeable deployment with vehicle wheels on the wheel attachment interfaces on the rear drive axle and the front drive axle, respectively, the interchangeable track system including:
  a pair of rear roller frame mount arms and a pair of front roller frame mount arms each having a shaft frame configured for independent mounting on the rear chassis portion and the front chassis portion, respectively, of the vehicle chassis beneath the rear drive axle and the pair of front drive axle, respectively, each of the pair of rear roller frame mount arms and the pair of front roller frame mount arms comprising:
    a shaft frame; and
    an arm mount frame comprising a top frame plate carried by the shaft frame, the top frame plate configured for removable and direct mounting on the vehicle chassis beneath and independently of each corresponding one of the rear drive axle and the front drive axle, the top frame plate substantially perpendicular to a plane of the shaft frame:
  a roller frame pivot mount shaft extending from the shaft frame; and
  a pair of rear track assemblies and a pair of front track assemblies configured for removable mounting on the pair of rear roller frame mount arms and the pair of front roller frame mount arms, respectively, each of the pair of rear track assemblies and the pair of front track assemblies including:
    an elongated roller frame configured for pivotal attachment to each corresponding one of the pair of rear roller frame mount arms and the pair of front roller frame mount arms, the roller frame having a front roller frame end, a rear roller frame end and a pivot shaft opening extending laterally through the roller frame substantially equidistant between the front roller frame end and the rear roller frame end at a center of gravity of the roller frame, the pivot shaft opening configured to receive the roller frame pivot mount shaft;
    a front idler roller and a rear idler roller carried by the roller frame;
    a track trained on the front idler roller and the rear idler roller; and
    a sprocket configured for attachment to each corresponding one of the wheel attachment interfaces on the rear drive axle and the front drive axle, respectively, in interchangeable relationship with each corresponding one of the vehicle wheels, the sprocket drivingly engaging the track.

18. The interchangeable track system vehicle of claim 17 wherein the shaft frame of each of the pair of rear roller frame mount arms has a parallelogram shape and the shaft frame of each of the pair of front roller frame mount arms is generally elongated and rectangular.

19. The interchangeable track system vehicle of claim 17 further comprising a plurality of shaft mount plates extending between the shaft frame and the roller frame pivot mount shaft.

20. The interchangeable track system vehicle of claim 17 further comprising a forklift insertion frame carried by the shaft frame.

* * * * *